(12) United States Patent
Polly et al.

(10) Patent No.: US 8,234,619 B2
(45) Date of Patent: Jul. 31, 2012

(54) SYSTEM, METHOD, AND SOFTWARE FOR FACILITATING BUSINESS OBJECT DEVELOPMENT TESTING

(75) Inventors: Adam Polly, Stutensee-Blankenloch (DE); Jan Hrastnik, Burscheid (DE)

(73) Assignee: SAP AG, Walldorf (DE)

( * ) Notice: Subject to any disclaimer, the term of this patent is extended or adjusted under 35 U.S.C. 154(b) by 1481 days.

(21) Appl. No.: 11/737,991

(22) Filed: Apr. 20, 2007

(65) Prior Publication Data
US 2008/0263503 A1 Oct. 23, 2008

(51) Int. Cl.
*G06F 9/45* (2006.01)
(52) U.S. Cl. .......................... 717/100; 717/124
(58) Field of Classification Search .................. 717/100, 717/124
See application file for complete search history.

(56) References Cited

U.S. PATENT DOCUMENTS

| | | | |
|---|---|---|---|
| 6,223,094 B1 | 4/2001 | Muehleck et al. | |
| 6,691,301 B2 * | 2/2004 | Bowen | 717/114 |
| 6,789,252 B1 * | 9/2004 | Burke et al. | 717/100 |
| 7,051,316 B2 * | 5/2006 | Charisius et al. | 717/103 |
| 7,725,907 B2 | 5/2010 | Bloching et al. | |
| RE41,476 E | 8/2010 | Muehleck et al. | |
| 7,984,020 B2 | 7/2011 | Brunswig et al. | |
| 2003/0074177 A1 * | 4/2003 | Bowen | 703/22 |
| 2003/0182167 A1 | 9/2003 | Kalthoff et al. | |
| 2005/0268255 A1 | 12/2005 | Hrastnik et al. | |
| 2007/0150387 A1 * | 6/2007 | Seubert et al. | 705/31 |
| 2008/0004856 A1 * | 1/2008 | Avitzur et al. | 703/17 |
| 2008/0120129 A1 | 5/2008 | Seubert et al. | |
| 2008/0133303 A1 * | 6/2008 | Singh et al. | 705/8 |
| 2008/0162264 A1 | 7/2008 | Bloching et al. | |
| 2008/0263503 A1 | 10/2008 | Polly et al. | |
| 2009/0165079 A1 | 6/2009 | Brunswig et al. | |
| 2010/0318974 A1 | 12/2010 | Hrastnik et al. | |

* cited by examiner

*Primary Examiner* — John Chavis
(74) *Attorney, Agent, or Firm* — Fish & Richardson P.C.

(57) ABSTRACT

The present disclosure relates to methods, systems, and software for developing or testing business objects. The method includes identifying at least one of a plurality of business objects in a development environment, parsing the identified business objects to determine various graphical views with at least one of the graphical views comprising a structural presentation of the business object, filtering the structural presentation based on one or more filter criteria, and presenting at least a portion of the views including the structural view.

22 Claims, 10 Drawing Sheets

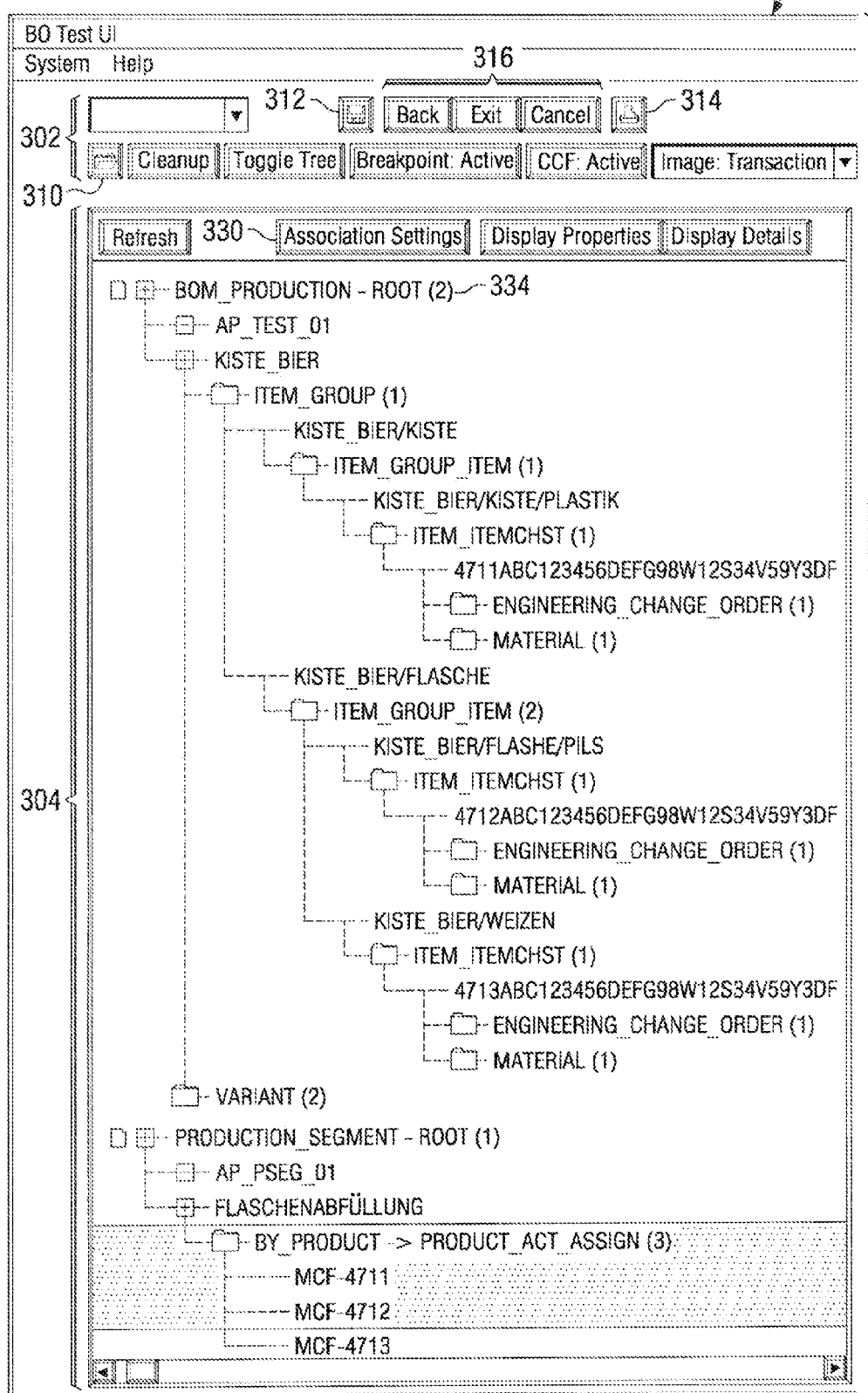

| Edit mode: Edit ▼ | BO Mockup: Active | Settings | MODIFY Container |

306

| Table View | Form View |

Association BY_PRODUCT -> Node PRODUCT_ACT_ASSIGN

| Refresh | Properties: Active | AssociationFilter: Active | Create | Delete | Check ▼ |

| Action ▼ | Action w. ref. | Filter | Find | Sort | Export | Layout ▼ |

| MATERIAL_ID-CONTENT | PROD_BOO_OP_ID | JOINT_PROD_MAT... | PROD... |
|---|---|---|---|
| MCF-4711 | | 3 | 12.5 |
| MCF-4712 | | 3 | 345 |
| MCF-4713 | | 3 | 4 |

FROM FIG. 3A

308

LCP Trace

| Refresh | Stack Level: ALL | Load into Tree |

```
▶ ☐ 1 RETRIEVE_DEFAULT_NODE_VALUES   BOO_PRODUCTION-HEADER   0,005567sec
▼ ☐ 2 MODIFY                          BOO_PRODUCTION          0,037790sec
    ▼ ▤ Request
        ▫ IN_BO_NAME                  BOO_PRODUCTION
        ▼ ▫ IN_MODIFICATIONS
            ▶ ▫ STRUCTURE
    ▼ ▤ Response
        ▼ ▫ OUT_CHANGE_NOTIFICATIONS
            ▶ ▫ CREATE_NOTIFICATIONS
            ▼ ▫ SUC_CREATE_NOTIFICATIONS
                ▼ ▫ STRUCTURE
                    ▫ BO_NAME         BOO_PRODUCTION
                    ▫ BO_NODE_NAME    HEADER
                    ▫ NODE_ID         8003BAA9D1A31DE899C6732CBED201F0
```

*FIG. 8A*

Table View | Form View

Association BY_PRODUCT -> Node PRODUCT_ACT_ASSIGN

[Refresh] [Properties: Active] [AssociationFilter: Active] [Create] [Delete] [Check ▼]

[Action ▼] [Action w. ref.] [Filter] [Find] [Sort] [Export] [Layout ▼]

| MATERIAL_ID-CONTENT | PROD_BOO_OP_ID | JOINT_PROD_MAT... | PROD... |
|---|---|---|---|
| MCF-4711 | | 3 | 12,5 |
| MCF-4712 | | 3 | 345 |
| MCF-4713 | | 3 | 4 |

*FIG. 8B*

Table View | Form View

Association BY_PRODUCT -> Node PRODUCT_ACT_ASSIGN

BO Node Instance (2/3) [MCF-4712]  [<-- Previous] [Next -->]

[Refresh] [Properties: Active] [AssociationFilter: Active] [Create] [Delete] [Check ▼]

[Action ▼] [Action w. ref.]

| | |
|---|---|
| MATERIAL_ID-CONTENT | MCF-4712 |
| PROD_BOO_OP_ID | |
| PROD_BOO_ACT_ID | |
| VAR_PRODUCT_OUTPUT_QUANT-CONTENT | 345 |
| VAR_PRODUCT_OUTPUT_QUANT-UNIT_CODE | PC |
| VAR_PRODUCT_OUTPUT_QUANT_TYPE-CONTENT | PC |
| JOINT_PROD_MAT_ROLE_CODE | 3 |

US 8,234,619 B2

SYSTEM, METHOD, AND SOFTWARE FOR FACILITATING BUSINESS OBJECT DEVELOPMENT TESTING

TECHNICAL FIELD

This disclosure relates to software and, more particularly, to systems and software for developing and testing business objects.

BACKGROUND

Modern businesses typically employ software, such as an Enterprise Resource Planning ("ERP") program, that is configured to manage a portion or all of the business's inventory, sales, personnel, contacts, billing, and so forth. These enterprise software systems are generally large and complex. Such systems can require many different components, distributed across many different hardware platforms, possibly in several different geographical locations. For example, this business software may be designed to utilize business objects. Business objects are typically objects in an object-oriented computer program that encapsulate various business-related tasks. For example, an order entry program may employ business objects to represent orders, line items, invoices, and the like. Typically, business objects encapsulate all of the data and behavior associated with the business process or entity that it represents. For example, an order-related business object may be responsible for loading an order from a database, modifying any data associated with that order, and then saving the order back to the database. Business objects are typically developed (e.g., written, tested, etc.) by a business object developer (e.g., a programmer). Because business objects are employed in a variety of potentially critical business applications, it may be advantageous for business object developers to thoroughly test the functionality of a business object before putting the business object into service. However, conventional business object development systems may make it difficult to thoroughly test all of the interactions of a business object. Accordingly, many business object programming errors or flaws are discovered after a business object has malfunctioned during an actual business event.

SUMMARY

The present disclosure relates to methods, systems, and software for developing business objects. The method includes identifying at least one of a plurality of business objects in a development environment, parsing the identified business objects to determine various graphical views with at least one of the graphical views comprising a structural presentation of the particular business object, filtering the structural presentation based on one or more filter criteria, and presenting at least a portion of the views including the structural view.

In another general aspect, there is a business object developer's tool including means for identifying at least one of a plurality of business objects in a development environment, means for parsing the identified business objects to determine various graphical views, at least one of the graphical views comprising a structural presentation of the business object, means for filtering the structural presentation based on one or more filter criteria, and means for presenting at least a portion of the views including the structural view.

According to another implementation, there is provided software for managing data, the software comprising computer readable instructions operable when executed to identify at least one of a plurality of business objects in a development environment, parse the identified business objects to determine various graphical views, at least one of the graphical views comprising a structural presentation of the business object, filter the structural presentation based on one or more filter criteria, and present at least a portion of the views including the structural view.

Implementations may include one or more of the following features. For example, the structural presentation may be a hierarchical presentation of the business object. In another example, the structural presentation may be filtered based on intra-business object associations. Further, the structural presentation may include a number beside at least one of the business object nodes, wherein the number is indicative of a number of instances of the business object node. The at least a portion of the view may include a detailed view, wherein the detailed view is associated with one or more of the business objects. The structural view and the detailed view may be simultaneously presented on a graphical user interface. The presented detailed view may include dialog that enables modification of one or more of the business object instances. The portion of the view may include presenting a testing interface. The testing interface may include a breakpoint selection dialog. The testing interface may also include a trace dialog. The testing interface may also include a context menu. The context menu may have an execute check functionality or may have an execute modify functionality.

Moreover, some or all of these aspects may be further included in respective systems or other devices for executing, implementing, or otherwise supporting business object management using the disclosed techniques (or similar others). The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 3 illustrates an exemplary business object development in accordance with one implementation of the present disclosure;

FIGS. 8A and 8B illustrate a Table View tab and a Form View tab in accordance with some configurations of the interface of FIG. 3 in accordance with certain embodiments of the present disclosure.

DETAILED DESCRIPTION

Figure 1:
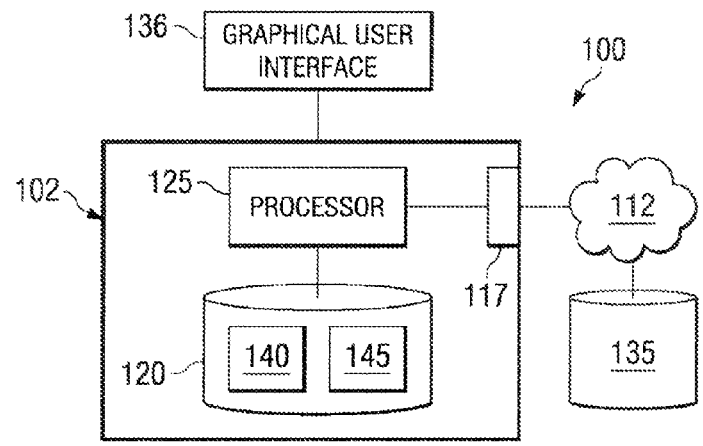
FIG. 1 illustrates an exemplary business object development system that is configured to enable developers to design and test business objects in accordance with one implementation of the present disclosure.

The present disclosure relates to methods, systems, and software for developing and testing business objects, illustrated herein as business objects 140. Business object 140 can be considered a representation of a business entity, such as an employee or a sales order. The business object 140 may encompass both functions (for example, in the form of methods) and data (such as one or more attributes) of the business entity. For example, the business objects 140 can be used to reduce a system into smaller, disjunctive units. As a result, the business objects 140 may improve a system's structure while reducing system complexity. The implementation details of business object 140 are typically hidden from a non-development user, such as an end user and the business object 140 may be accessed through defined functions and encapsulated. The business objects 140 also form a point of entry of the data and functions of a system and enable the system to easily share data, communicate, or otherwise operate with other systems. According to one implementation, the business objects 140 may include multiple layers.

Generally, the testing environment described herein provide a hierarchical presentation of business object instances in a navigation tree, which may include a context menu that exposes relevant functions. The testing environment may also generate or include an integrated log/protocol that shows the interaction of the business object service provider implementations including the request and response part or each service call including all messages and notifications. The business object representation (e.g. in a structural view) may be automatically updated based on change notifications that are issued by the business object. Newly created objects may be automatically loaded into the structural view and table view. Further, for performance reasons, the user may decide to restrict the automatic updates in order to reduce response times and trigger refresh operations of the test UI manually. In some circumstances, the testing environment may allow for the entire functionality of the business object to be tested, the structure of the business object instance to be presented and understood, tracing integrated so that tool switches can be unnecessary.

In some cases, these business objects 140 may be utilized by models. At a high level, the model is a representation of a software system, part of a software system, or an aspect of a software system. The model can be associated with one or more views. A view of the model represents a subset of the information in the model. For purposes of discussion, the term "model" will be used to refer to both the model or a view of the model. The model can be used in a software development process to describe or specify a software application, or parts or aspects of a software application, for developers implementing or modifying the application. The model specifies the design to a useful level of detail or granularity. In this way, a compliant implementation or deployment of the modeled functionality can conform to the specification represented by the model. For example, the model may represent a sequence of steps, executed to achieve a business result. According to the particular design, each step can result in the change of state of one of the business objects 140. Business processes can be part of, triggered by, and superior to other business processes. Business processes can be modeled in a hierarchy. As described herein, the business process hierarchy includes a requirements definition, design specification, and implementation description level, but other ways of defining a business process or other view hierarchy are possible. Thus, the models described herein can be written in description notations appropriate for process modeling.

Turning now to the drawings, FIG. 1 illustrates an exemplary business object development system 100 that helps developers design and test business objects 140. As illustrated, the system 100 may include a client 102, a network 112, a distributed storage location 135 such as a business object (or enterprise service) repository, and a graphical user interface ("GUI") 136. In other embodiments, the system 100 may also include other suitable components.

The client 102 may be any computer or other suitable processing device, such as, for example, a blade server, general-purpose personal computer ("PC"), Macintosh, workstation, Unix-based computer, or any other suitable device. Moreover, the client 102 may also be a computer other a general purpose computers or a computer having a conventional operating system. The client 102 may be adapted to execute any suitable operating system including Linux, UNIX, Windows, MAC OS, and so forth. The client 102 may also include a processor 125. The processor 125 executes instructions, such as the business object development application 145 described further below, and manipulates data to perform the operations of the client 102. In various configurations, the processor 125 may be, for example, a central processing unit ("CPU"), a blade, an application specific integrated circuit ("ASIC"), a field-programmable gate array ("FPGA"), or other suitable logic device. Although FIG. 1 illustrates a single processor 125 in the client 102, multiple processors 125 may be used according to particular needs and reference to processor 125 is meant to include multiple processors 125 where applicable.

The client 102 also includes a memory 120. The memory 120 may include any memory or storage module and may take the form of volatile or non-volatile memory including, without limitation, one or more of the following: magnetic media, optical media, random access memory ("RAM"), read-only memory ("ROM"), removable media, or any other suitable local or remote memory component. The memory 120 may be internally or externally coupled to the client 102 and may store any appropriate data including business objects 140 and/or the business object development application 145. Although the memory 120 is illustrated as a single storage device, in many embodiments, the memory 120 may include a plurality of different storage device in communication with each other. For example, in one configuration, the memory 120 includes RAM and a persistent storage medium, such as a hard disk drive, that are communicably coupled. In this configuration, business objects 140 and business object development application 145 may be stored in one or both of the RAM and the persistent storage medium. In addition, the memory 120 may also store or reference any other appropriate data. For example, the memory 120 may include instructions or data for one or more applications, such as operational instructions, software, VPN applications or services, firewall policies, a security or access log, print or other reporting files, HTML files or templates, related or unrelated software applications or sub-systems, and others.

Business objects 140 are typically objects in an object-oriented computer program that abstract the entities in the ESA environment that the program is written to represent. For example, an ESA environment may include business objects 140 to represent orders, line items, invoices and the like. Typically, the business objects 140 encapsulate all of the data and behavior associated with the business process or entity that it represents. For example, an order-related business object may be responsible for loading an order from a database, modifying any data associated with that order, and then saving the order back to the database.

Business objects 140 may be stored in a business object repository that is within, referenced by, or pointed to by the memory 120. In some embodiments, the business object repository may be stored in one or more tables in a relational database described in terms of SQL statements or scripts. In the same or other embodiments, the business object repository may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the business object repository may comprise one table or file or a plurality of tables or files stored on one computer or across a plurality of computers in any appropriate format. Indeed, some or all of the business object repository may be local or remote without departing from the scope of this disclosure and store any type of appropriate data. In particular embodiments, the business object repository may access the business objects in response to queries from one or more clients.

The business objects 140 may represent organized data relating to some project or endeavor, which may or may not be linked, with each object having one or more states related to the object. Each of the states, in turn, is associated with data that pertains to various modifiable parameters of the individual states of the object. One type of data modeling that includes multiple objects with each having multiple states, and each state having multiple instances of changes to the state's modifiable parameters is the business object model. Briefly, the overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects 140 and their relationship to each other (the overall net structure).

As described in more detailed below with respect to FIG. 2, business objects 140 are thus a capsule with an internal hierarchical structure, behavior offered by its operations, and integrity constraints. Business objects are generally semantically disjointed, i.e., the same business information is represented once. In some embodiments, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects 140 are generally arranged from the top to the bottom based on defined order of the business areas, e.g., finance could be arranged at the top of the business object model with customer relationship management ("CRM") below finance and supplier relationship management ("SRM") below CRM. To ensure the consistency of interfaces, the business object model may be built using standardized data types as well as packages to group related elements together, and package templates and entity templates to specify the arrangement of packages and entities within the structure. This helps ensure the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

Figure 2:
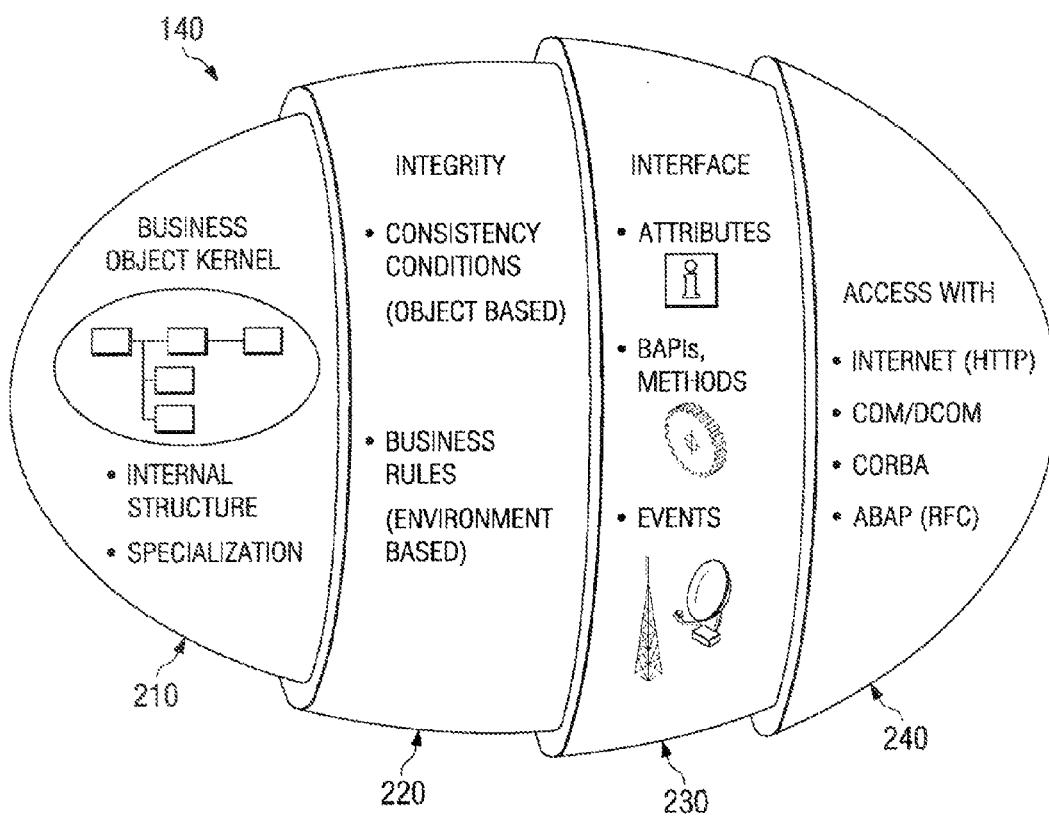
FIG. 2 is a graphical illustration of an example business object and associated components as may be used in the system of FIG. 1.
Figure 4A:
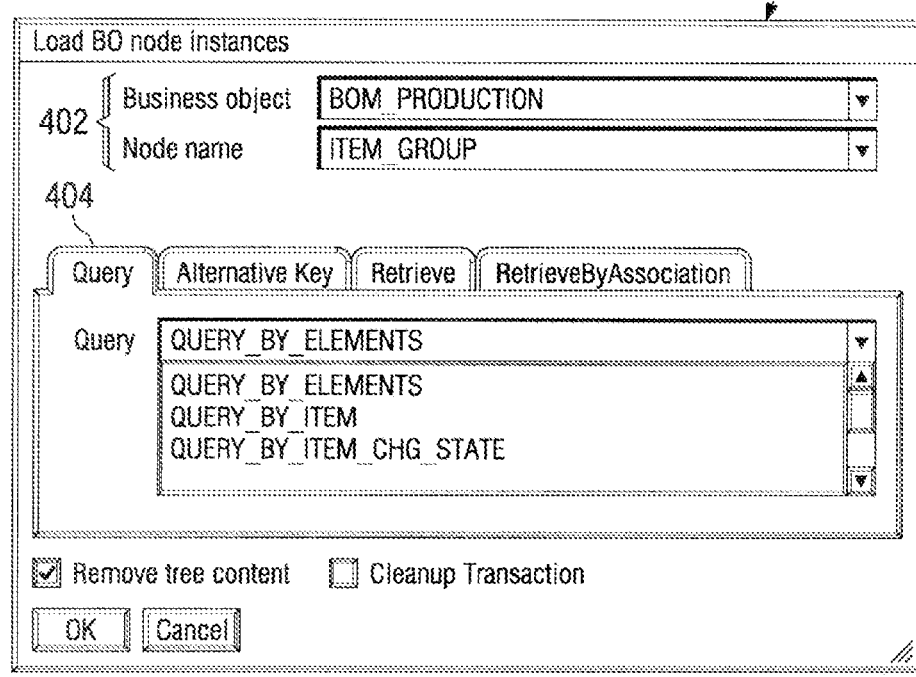
FIGS. 4A-4D illustrate four aspects of a business object loading user interface that can be employed to load business objects into the business object development user interface of FIG. 1 in accordance with one implementation of the present disclosure.
Figure 4B:
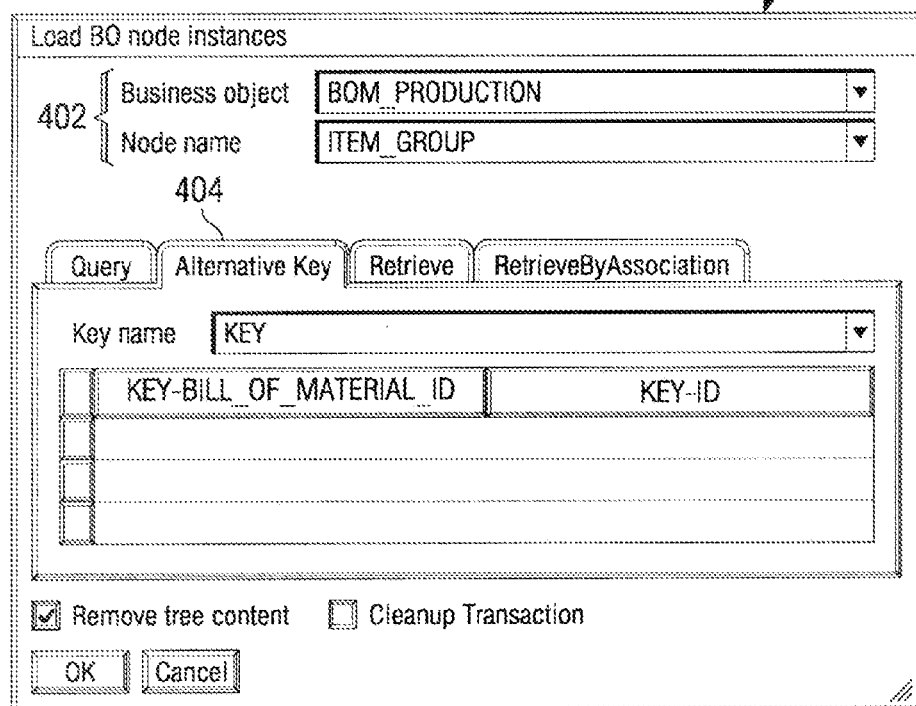
Figure 4C:
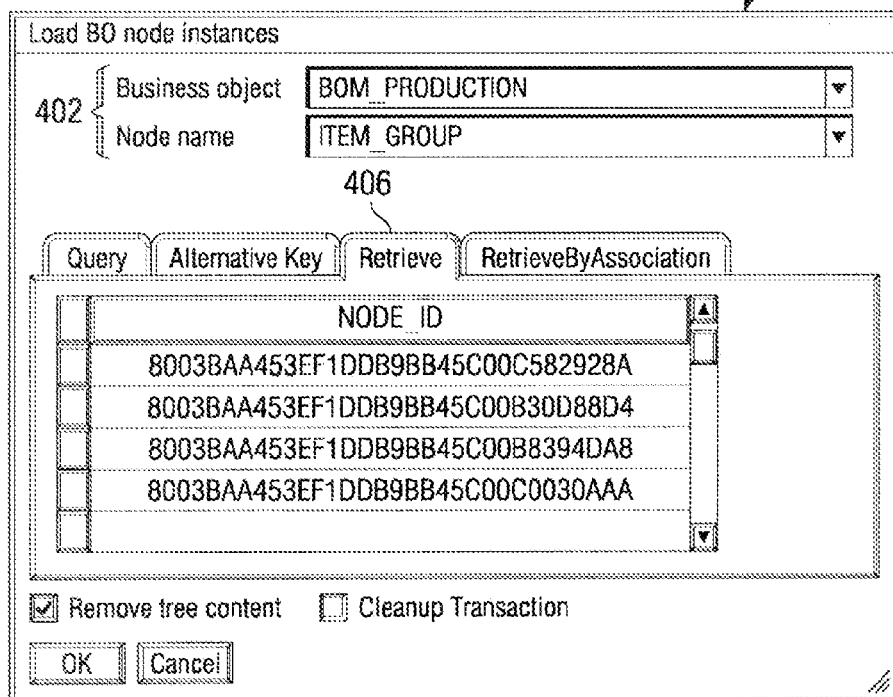
Figure 4D:
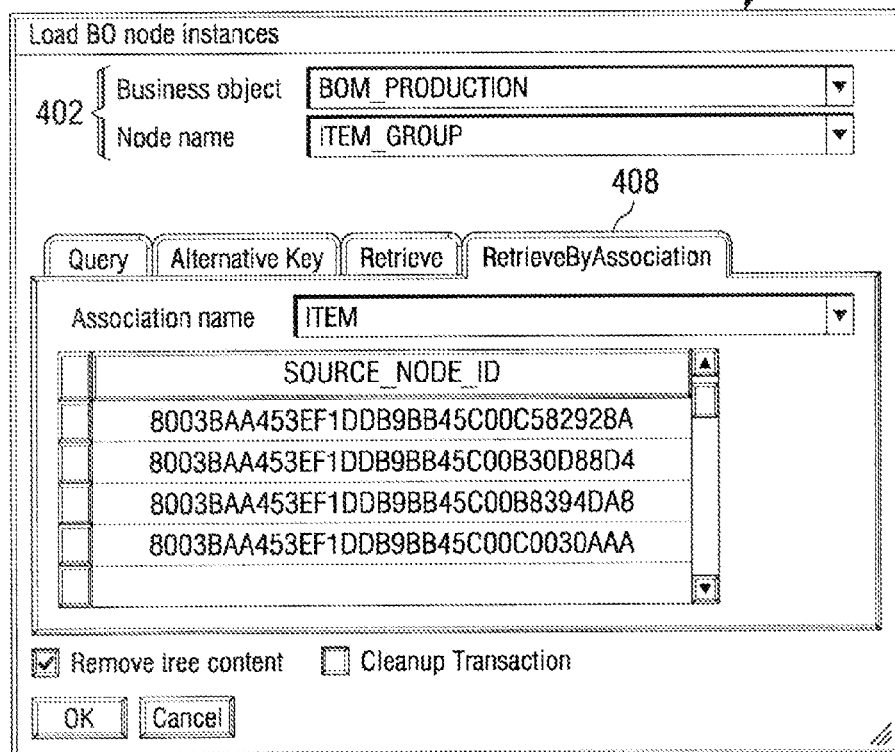

FIG. 2 provides a graphical representation of one of the business objects 140. As shown, an innermost layer or kernel 210 of the business objects 140 may represent the business object's 140 inherent data. Inherent data may include, for example, an employee's name, age, status, position, address, etc. A second layer 220 may be considered the business object's 140 logic. Thus, the layer 220 includes the rules for consistently embedding the business object 140 in a system environment as well as constraints defining values and domains applicable to the business object 140. For example, one such constraint may limit sale of an item only to a customer with whom a company has a business relationship. A third layer 230 includes validation options for accessing the business object 140. For example, the third layer 230 defines the business object's 140 interface that may be interfaced by other business object's 140 or applications. A fourth layer 240 is the access layer that defines technologies that may externally access the business object 140.

Accordingly, the third layer 230 separates the inherent data of the first layer 210 and the technologies used to access the inherent data. As a result of the described structure, the business object 140 reveals only an interface that includes a set of clearly defined methods. Thus, applications may only access the business object 140 via those defined methods. An application wanting access to the business object 140 and the data associated therewith usually includes the information or data to execute the clearly defined methods of the business object's 140 interface. Such clearly defined methods of the business object's 140 interface represent the business object's 140 behavior. That is, when the methods are executed, the methods may change the business object's 140 data. Therefore, an application may utilize any business object 140 by providing the information or data without having any concern for the details related to the internal operation of the business object 140.

The business objects 140 stored in the memory 120 may include instantiated business objects, fully developed business objects, or partially developed (in development) business objects. For example, one of the business objects 140 may be a business object that is ready for deployment and is in the final stages of logic and functionality testing. In another example, the business object 140 may be a new business object that is in the early stages of its modeling or development. Other business objects 140 may be in various stages of coding, development, and testing. Business objects 140 may also be stored in a distributed storage location 135, such as a remote business object repository or a server, both of which are accessible via network 112.

Other than business objects 140, the system 100 may be employed to develop various other suitable data services that can combine web services and data from multiple systems, in an application design made possible by a composite application framework. This framework typically includes the methodology, tools, and run-time environment to develop composite applications. It may provide a consistent object model and a rich user experience. Regardless of the particular type, category, or classification of the component, the system 100 often stores metadata and other identifying information along with the actual piece of software (whether object or source). For example, the service may further include each component's definition, lifecycle history, dependents, dependencies, versions, use or "big name" cases, industry types or associations, role types, security profile, and usage information.

Returning to FIG. 1, the business object development system 100 may also include the business object development application 145, which may include instructions, code, programs, or other software stored in the memory 120 and configured to be executable by the processor 125. At a high level, business object development application 145 may be operable to test the functionality of the business objects 140, test the interaction between business objects 140, and/or describe messages created by outbound agents and the process flow. More specifically, business object development application 145 may help developers better understand the business object models and to work with a generic interface based on the business object model. In one configuration, the business object development application 145 may include computer readable instructions in memory 120 that, when executed, generate a business object development user interface, as described further below. In other configurations, the business object development application 145 may be stored on any other suitable computer readable storage medium within the system 100. For example, the business object development application 145 may be fully or partially stored on a server and remotely accessible by client 102. Put simply, the business object development application 145 may be any development tool, toolkit, application programming interface (API), application, or other framework that allows a developer to develop, configure, and utilize various business elements that can be more easily modeled during modeling (or during design time) of a particular business application. For example, the model-driven framework or environment may allow the developer to use simple drag-and-drop techniques to develop pattern-based or freestyle user interfaces and define the flow of data between them. Such drag and drop techniques may include selecting, inputting, identifying, or some other indication that the developer is interested in a particular object or element. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding; in other words, the modeling environment can be used to create, modify, and examine the model.

In some cases, this example business object development application 145 may provide a personalized, secure interface that helps unify enterprise applications, information, and processes into a coherent, role-based portal experience. Further, the modeling environment may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment may provide a shared set of services for finding, organizing, and accessing unstructured content stored in third-party repositories and content management systems across various networks 112. Classification tools may automate the organization of information, while subject-matter experts and content managers can publish information to distinct user audiences. Regardless of the particular implementation or architecture, this modeling environment may allow the developer to easily model various elements using this model-driven approach. As described in more example detail later, the model is deployed, and environment 100 may translate the model into the required code for at least one application 124 or web service.

As described above, in the illustrated embodiment, the processor 125 executes the business object development application 145 stored in the memory 120. But it will be understood that the business object development application 145 may be stored (and executed from) on any suitable computer readable medium including software, firmware, wired or programmed hardware, or any combination thereof as appropriate. Moreover, the business object development application 145 may be written or described in any appropriate computer language including C, C++, Java, Visual Basic, assembler, Perl, any suitable version of 4GL, as well as others. For example, portions of the business object development application 145 may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's NET. Further, while illustrated as internal to client 102, one or more processes associated with the business object development application 145 may be stored, referenced, or executed remotely. For example, a portion of business object development application 145 may be a web service that is remotely called, while another portion of business object development application 145 may be an interface object bundled for processing at remote site. Moreover, business object development application 145 may be a child or sub-module of another software module or enterprise application without departing from the scope of this disclosure.

Often, these business objects 140 are utilized in, or the development application 145 is used to develop, a business application or other business functionality or logic. For example, this business application 124 may be a modeled composite application with any number of portions that may be implemented as Enterprise Java Beans (EJBs) or the design-time components may have the ability to generate run-time embodiments into different platforms, such as J2EE, ABAP (Advanced Business Application Programming) objects, or Microsoft's NET. In a further example, the business application may be a hosted solution or merely a published web service. More specifically, the business application may be a composite application, or an application built on other applications, that includes an object access layer (OAL) and a service layer. In this example, application 118 may execute or provide a number of application services, such as logistics inventory management (LIM), customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. Further, the business application may run on a heterogeneous IT platform. In doing so, the business application may be cross-functional in that it may drive business processes across different applications, technologies, and organizations. Accordingly, the business application may drive end-to-end business processes across heterogeneous systems or sub-systems. The business application may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide RFC capability. It will be understood that while this example describes the composite business application, it may instead be a standalone or (relatively) simple software program.

The client 102 may also include interface 117 for communicating with other remote computers or storage devices, such as remote storage location 135 over network 112. Generally, the interface 117 comprises logic encoded in software and/or hardware in a suitable combination and operable to communicate with the network 112. More specifically, the interface 117 may comprise software supporting one or more communications protocols associated with the network 112 or hardware operable to communicate physical signals.

Network 112 facilitates wireless or wireline communication between client 102 and any other local or remote computer or storage device. Network 112 may be all or a portion of an enterprise or secured network. In another example, network 112 may be a VPN merely between client 102 and remote storage location 135 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between client 102 and one or more other remote storage locations or remote systems. For example, client 102 may be communicably coupled to one or more "local" repositories through one sub-net while communicably coupled to "remote" repositories through another. In other words, network 112 encompasses any internal or external network, networks, sub-network, or combination thereof operable to facilitate communications between various computing components in system 100. Network 112 may communicate, for example, Internet Protocol ("IP") packets, Frame Relay frames, Asynchronous Transfer Mode ("ATM") cells, voice, video, data, and other suitable information between network addresses. Network 112 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations.

The client 102 may also be coupled to a graphical user interface ("GUI") 136 operable to allow the user of client 102 to interface with at least a portion of system 100 for any suitable purpose, such as developing or testing a business object. Generally, GUI 136 provides a particular user with an efficient and user-friendly presentation of data provided by or communicated within system 100. For example, GUI 136 may present the user with the components and information that is relevant to their task, increase reuse of such components, and facilitate a sizable developer community around those components. GUI 136 may comprise a plurality of customizable frames or views having interactive fields, pull-down lists, and buttons operated by the user. For example, GUI 136 is operable to display certain data services in a user-friendly form based on the user context and the displayed data. In another example, GUI 136 is operable to display different levels and types of information involving business object development, as described below. GUI 136 may present a plurality of windows, dialogs, portals, or dashboards, which may be appropriate output format including PDF, HTML, and printable text.

It should be understood that the term GUI may be used in the singular or in the plural to describe one or more graphical user interfaces and each of the displays of a particular graphical user interface. Indeed, reference to GUI 136 may indicate a reference to the any suitable front-end without departing from the scope of this disclosure. Therefore, GUI 136 contemplates any graphical user interface, such as a generic web browser or touchscreen, which processes information in system 100 and efficiently presents the results to the user. In one embodiment, the GUI 136 may be displayed by a video display unit, such as a television, monitor, or video projector.

As discussed above, the business object development system 100 is configured to generate a graphical view of one or more business objects in the form of a business object development user interface that may be displayed on the GUI 136. An exemplary business object development interface 300 in accordance with certain embodiments is illustrated in FIG. 3. The interface 300 may include one or more of four subsections: a user interface control section 302, a structural view section 304, a detailed view section 306, and a testing section 308. Although the business object development interface 300 is illustrated in FIG. 3 as including each of the sections 302-308, in various embodiment, the interface 300 may include less than all of the sections 302-308 or may include other components or sections in addition to one or more the sections 302-308.

Looking first at the user interface control section 302, the section 302 includes one or more controls (e.g., click-able buttons/icons, drop-drop menus, etc.) that can be employed to manage the general interaction of the interface 300 with business objects 140. For example, load control 310 enables a user to load new business object node instances (also referred to as "business object instances" or "nodes"). For example, FIGS. 4A-4D illustrate four aspects of a business object loading user interface 400 that can be employed to load business objects into the business object development user interface 300. In particular, FIGS. 4A-4D illustrates four "tabs" that may be part of the interface 400.

As shown in FIGS. 4A-4D, the loading interface 400 may include controls 402 that enable users to input or select a desired business object and/or a desired node name. The "Query" tab 404 shown in FIG. 4A may provide an interface for a user to perform a query of a selected business object or node. For example, a user could select to query the business objects 140 by elements, by an item, or by items that have been changed (see, for example, FIG. 4A). "Alternate Key" tab 404 (FIG. 4B) of the interface 400 enables users to query or locate business object instances by an alternative key. Similarly, the "Retrieve" tab 406 (FIG. 4C) enables users to load business object instances by NodeID. Lastly, "RetrieveByAssociation" tab 408 (FIG. 4D) enables users to load business object instances by their associations with other business objects, data, business process, and so forth. Although FIGS. 4A-4D illustrate four tabs 402-408 and four accompanying loading functionalities, the illustrated tabs and functionalities are not required. As such, in alternate embodiments, other loading functionalities may be employed by the business object development user interface 300 in addition to or in place of one or more the tabs 402-408. For example, in some embodiments, business object instances may be loaded from a favorites folder or other user preferred storage device or repository.

Returning to FIG. 3, user interface control section 302 may also include a plurality of other controls beside load control 310. For example, as shown, control section 302 may also include controls that enable business object instances to be saved or printed (controls 312 and 314, respectively), breakpoint controls 316, any other suitable types of user interface controls. For example, one of the illustrated controls is a toggle tree button that enables the user to simply enlarge or hide the structural view area, the detail view area, and so forth. Another control may be a business object mockup button that triggers additional functionality for testing purposes, such as triggering a simulation of the business object behavior. Notably, this functionality may also be added in a higher software layer. Still another exemplary control is a modify container button that provides the option to construct a complex modify call to the business object (e.g. create an entire BO instance within a single call).

Turning next to the structural view section 304, FIG. 3 illustrates a structural presentation of any loaded business object node instances. In various embodiments, the structural view section 304 may include a hierarchical view of business object node instances. For example, the hierarchical view may be a nested tree where multiple business object instances are grouped into items and sub-items, such that sub-items (e.g., business object instances) related to a particular item (e.g., another business object instance) can be viewed by expanding the portion of the tree for the item. In other embodiments, other structural presentations may also be employed. The structural view section 304 may include some or all of the results of core service invocation including, but not limited to, message objects, change/sync notifications. Advantageously, the structural view section 304 may be configured to display a variety of suitable business object related associations, including intra-business object and cross-business object associations. In some configurations, the associations displayed in the structural view section 304 may be generated based on one or more filter criteria selectable by a user via a user interface (e.g., dialog).

Figure 5A:
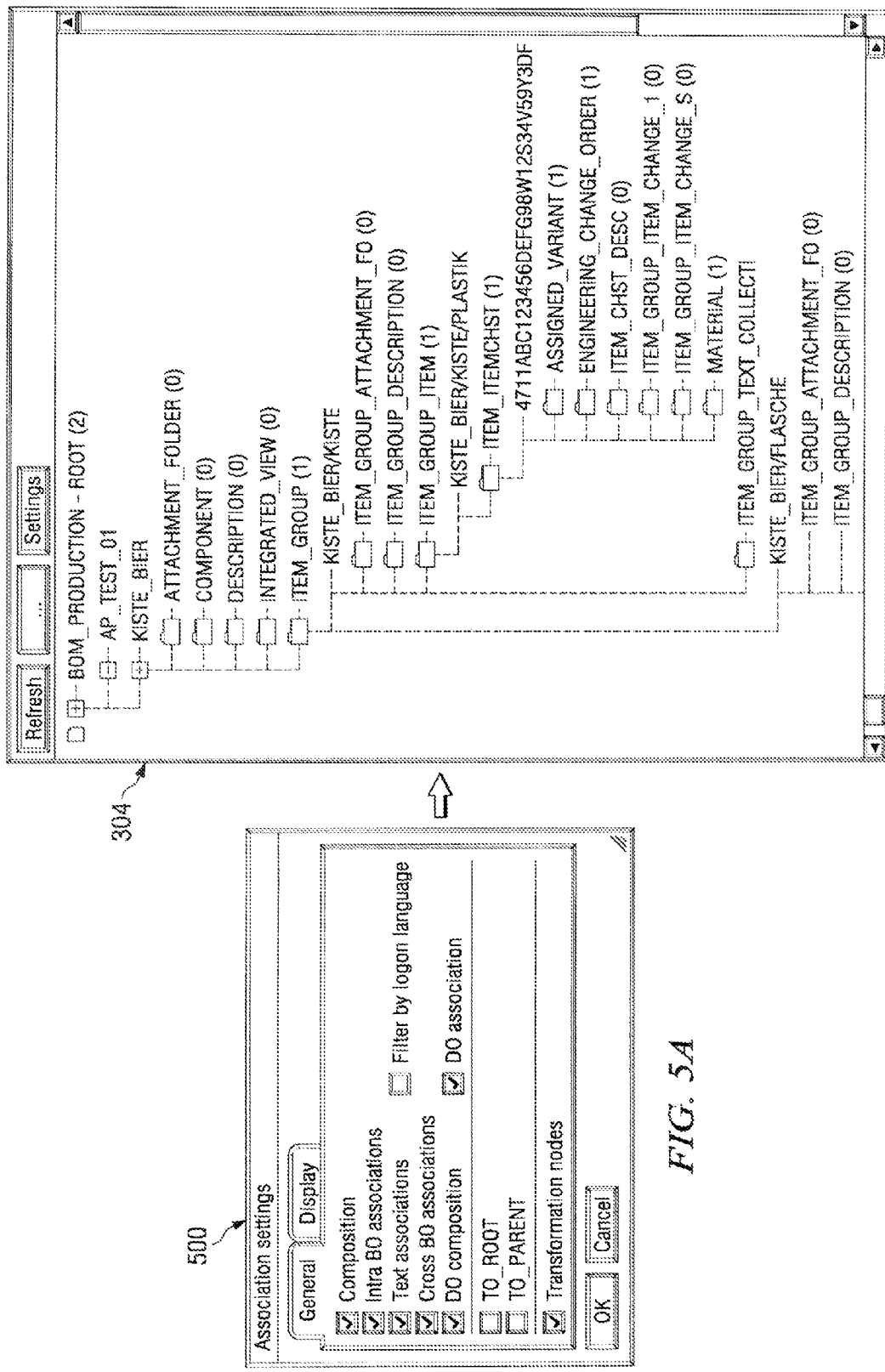
FIGS. 5A and 5B illustrate two examples of a filter selection dialog with a different selection of filter criteria and the structural view section that would be generated from that selection of filter criteria in accordance with one implementation of the present disclosure.
Figure 5B:
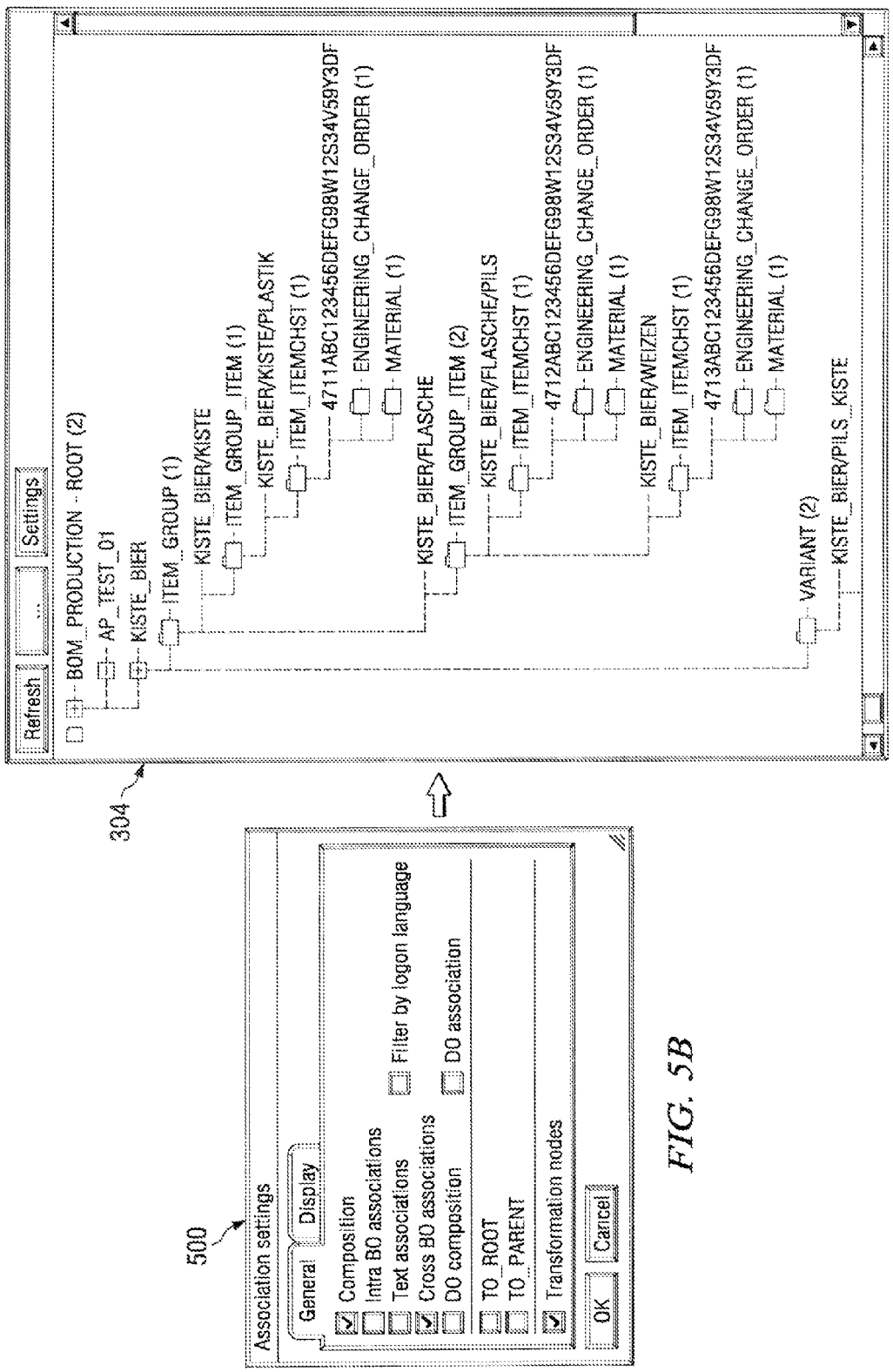

For example, FIG. 5A illustrates an example filter criteria selection dialog 500 in accordance with some embodiments. In some embodiments, the dialog 500 is displayed in response to the selection of the "Association Settings" control 330 shown in FIG. 3. The dialog 500 includes a variety of controls, such as, check boxes, that enable a user to select one or more filter criteria to be used in selecting which associations are displayed in the structural view section 304 of FIG. 3. As shown, dialog 500 may include a variety of filter criteria including composition, intra-business object associations, text associations, cross-business object associations, data object composition, data object association, logon language, To_Root, To_Parent, and Transformation nodes. These examples, however, are not intended to be exclusive and, in alternate embodiments, other suitable filter criteria may be employed in place of or in addition to one or more the filter criteria illustrated. FIG. 5A also includes an illustration of the structural view section 304 of FIG. 3 as it would look if filtered based on the filter criteria selected in dialog 500. FIG. 5B illustrates the dialog 500 with a different selection of filter criteria and the structural view section 304 that would be generated from that selection of filter criteria.

Figures 6, 9:
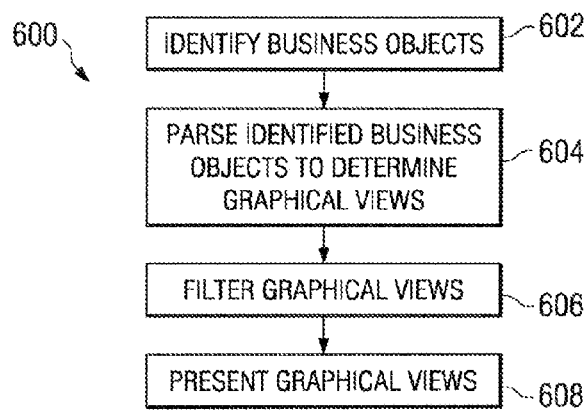
FIG. 6 illustrates an exemplary technique that may be employed by the system of FIG. 1 to present the graphical views of business objects in accordance with certain embodiments of the present disclosure.
FIG. 9 illustrates an exemplary dialog that may be displayed by the business object development system of FIG. 1 to allow a user to set breakpoints for testing in accordance with certain embodiments of the present disclosure.

As described above, business object development system 100 may be configured to present graphical views of one or more business objects, such as the business object development interface illustrated in FIG. 3. FIG. 6 illustrates an exemplary method 600 that may be employed by the system 100 to present the graphical views of the business objects 140. In various embodiments, the blocks of method 600 (see below) may be encoded as instructions within BO development application 145 that is stored in the memory 120 and executed by the client 102. In other embodiments, technique 600 may be executed by other suitable system or stored in other locations, such as the remote storage location 135.

As illustrated by block 602 of FIG. 6, method 600 may begin by identifying one or more business objects in a developer environment, such as the system 100. In one configuration, this identification may include loading one or more business objects, as described above in relation to FIGS. 4A-4D. In alternate configurations, other suitable manual or automatic identification techniques may also be used.

Next, the identified business objects 140 may be parsed to determine graphical views for the business objects, as indicated by block 604. For example, the parsing may include dividing instances of business object structurally to create a structural presentation of the business object. Additionally, the business object may be parsed to determine information for display in a detailed view or a testing view, as described further below.

The method 600 may also include filtering the graphical views, as indicated by block 606. In various embodiments, the filtering may include filtering the structural presentation based on one more filter criteria, as described above with regard to FIGS. 5A and 5B. In other embodiments, the filtering may use other suitable criteria. Lastly, the technique 600 includes presenting the graphical views, including the filtered structural view. For example, the technique 600 may include presenting the business object development user interface 300 on the GUI 136.

The preceding flowchart and accompanying description illustrate exemplary method 600. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

Figure 7:
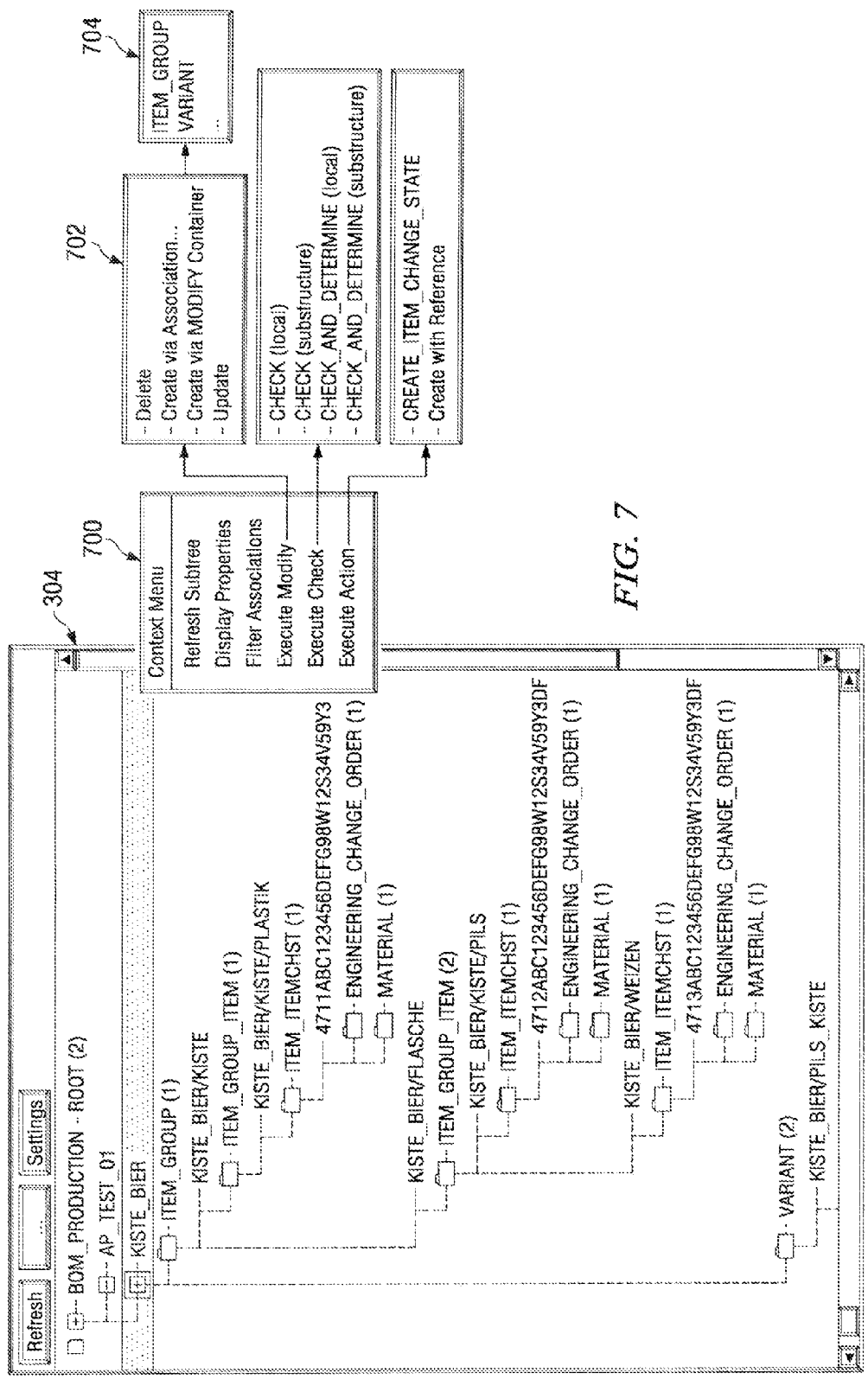
FIG. 7 illustrates an exemplary context menu generated for one of the business object instances displayed in structural view of FIG. 3 in accordance with certain embodiments of the present disclosure.

Business object development user interface 300 may also be configured to provide context menus that expose relevant functions or enable testing of the business objects 140. For example, FIG. 7 illustrates an exemplary context menu 700 that was generated for one of the business object instances displayed in structural view section 304. As described further below, context menu 700 may allow testing of one of more business objects to be initiated from the structural view section 304. In one embodiment, the context menu 700 is generated in response to a "right-click" on one of the business objects displayed in the structural view section 304. In other embodiment, alternate selection mechanisms may be employed.

Context menu 700 includes one or more functions that may be of interest to a business object developer regarding a selected business object 140. For example, in the illustrated embodiment, the context menu includes controls to refresh the subtree of the selected business object, display the properties of the selected business object, view or modify the filtered associations (see FIGS. 5 and 6 above), execute a modify, execute a business check, and/or execute an action of the business object. As illustrated, one or more of the items from the context menu 700 may, when selected, spawn sub-menus 702, which in turn may spawn additional sub-menus 704, as appropriate.

Context menu 700 enables the user of the business object development user interface 300 to invoke service methods that are exposed by the business object service interface for testing purposes, e.g. triggering changes (updates, creations and deletions) of BO node instances, executing actions that are defined for the selected business object node instances in the tree, executing checks on the consistency of the business object instances as well as to load business object node instances. Functions that are disabled via the underlying properties of the selected business object node instances may be excluded from the context menu 700. Further, this behavior of the context menu 700 may be switched off (i.e. the user may decided to ignore the properties of the business object as long as switching off the properties does not contradict to the business object model). For example, if an action is dynamically disabled by the business object, it is possible to trigger this action for testing purposes. The context menu 700 may also enable the user to customize and influence the tree representation in the structural view section 304 (e.g. setting filters for associations, remove content from the structural view section 302, set sorting order of the structural view items). A context menu 700 may also be offered for the detailed view section 306.

Returning now to FIG. 3, the structural view section 304 may also include a numerical listing besides one or more of the business object instances listed in structural view. The numerical listing correlates to the number of sub-items below that particular business object instance in the structural view. Advantageously, presenting the numerical listing may enable a business object developer to determine the number of sub-items within an item without having to expanding the instances and count the sub-items.

Looking next to the right hand side of the interface 300, the detailed view section 306 is configured to enable a more detailed display of business objects 140 as well as to enable maintenance/modification of business object instances. In one embodiment, detailed view section 306 may be auto-populated by double-clicking on one or more of the business object instances displayed in the structural view section 304. Other selection techniques may also be employed.

As shown, the detailed view section 306 may include two tabs: a "Table View" tab and a "Form View" tab. In particular, FIG. 8A illustrates Table View tab 800 and FIG. 8B illustrates Form View tab 802 in accordance with some configurations of the interface 300. It will be appreciate, however, that the tabs 800 and 802 are merely illustrative of one technique for populating the detailed view section 306, and, as such, in alternate embodiments, other user interfaces or controls may be employed in the detailed view section 306. Further, both of the tabs 800 and 802 may be customized by a user to display specifically that detailed information that a particular user would like to see.

The Table View tab 800 of FIG. 8A displays a plurality of formatted outputs, such as Core Component Technical Specification (CCTS) types (or Global Data Types (GDTs) and code values and descriptions in the form of a table that may enable a user to interact with or view detailed information associated with a plurality of different business object instances in a tabular format. The Form View tab 802, on the hand, displays detailed information for a single business object instance in an easy to understand form. Both the Table View tab 800 and the Form View tab 802 may also be configured to enable users to switch specific properties on and off for a business object 140 or to create, update, or delete business objects 140 or business object instances.

The detailed view section 306 allows the user to display information of the respective business object node instances. For example, for testing purposes it may be possible to switch off/on properties (as long as switching off the properties does not contradict to the business object model) and to format/render values (e.g. with or without usage of upper case conversion for user input). Some or all of the change operations that can be applied to the business object node instances that are enabled (e.g., create, update, delete, check) also may be available in the detailed view section 306. The representation of the business object node instances may also be influenced by setting filters, sorting criteria, and so forth, which are accessible in the detailed view section 306. Further, the detailed view section 306 (or other sections of the business object development user interface 300) may be configured to export the business object content to MS EXCEL or another suitable spreadsheet or database program.

The Form View tab 802 provides an overview about the data of a single business object node instance, as the Table View tab 800 may be not be optimal for some types of business objects, such as those with a large number of attributes with long names. The Form View tab 802 will typically contain all the functions of the table view that can be applied to a single business object node instance. In addition, the Form View Tab 802 may allow users to navigate through the list of business object node instances that is displayed in the Table View tab 800 (e.g., next-previous buttons) showing the current selection (e.g. node 2 of 3).

Returning once again to FIG. 3, the business object development user interface 300 may also include testing section 308. The testing section 308 may include various testing and debugging utilities, such as a trace utility. The trace utility may display details of business object communication via Local Client Proxy (LCP), such as requests/responses to LCP calls. For example, trace utility may enable users to drill down through request and response parts of core service calls. Additionally, trace utility may display elapsed times for business object execution. The trace utility may also displays outbound messages via process agent framework (PAF). For example, the trace utility may include a list of created outbound messages and allow viewing of the XML content of their payloads. The trace utility or other sections of the business object development user interface 300 also may enable users to switch user interface names and technical names (e.g., ESR and PROXY) and may provide for the correct rendering of CCTS types (e.g., date, time, and duration) or global Data Types.

The testing section 308 may also include one or more controls that enable users to activate and deactivate the trace functionality of the business object development system 100; to select a stack level and/or business object for tracing; and/or to load business object instances into the structural view section 302. Further, testing section 308 may also provide a dialog to enable users to select breakpoints for testing or traces of business objects. Breakpoint functions may also be provided by other sections of the business object development user interface 300, such the "Breakpoint-Active" control in the structural view section 302. For example, FIG. 9 illustrates an exemplary dialog 900 that may be displayed by the business object development system 100 to allow a user to set breakpoints for testing. As shown, the dialog 900 includes a table listing a plurality of business object types 902 as rows and a plurality of potential breakpoints 904 as columns. The intersection of these rows and columns may be populated with checkboxes that enable users (e.g., business object developers) to set breakpoints for tests for the one or more of the business object instances 902. It will be appreciated, however, that the dialog 900 is merely one representative example of an interface that may be generated by the business object development system 100 to enable breakpoints to be set. Accordingly, in alternate embodiment, the dialog 900 may include any suitable one of the business objects 140 and a variety of suitable breakpoints. Moreover, the dialog 900 may also take any one of a number of other suitable forms (e.g., a form view).

Although this disclosure has been described in terms of certain embodiments and generally associated methods, alterations and permutations of these embodiments and methods will be apparent to those skilled in the art. For example, certain embodiments of system 100 may be a standalone, but networked, client that retrieves local information, identifies the context of the local user, and provides presentation elements associated with remote objects, applications, or other data accessible via the network. Accordingly, the above description of example embodiments does not define or constrain this disclosure. Other changes, substitutions, and alterations are also possible without departing from the spirit and scope of this disclosure.

What is claimed is:

1. A computer implemented method comprising:
identifying, using a computer, at least one of a plurality of business objects in a development environment;
parsing the identified business objects to determine various graphical views, at least one of the graphical views comprising a structural presentation of the business object;
filtering the structural presentation based on one or more filter criteria;
presenting at least a portion of the views including the structural view;
presenting a testing interface, wherein the testing interface includes a breakpoint selection dialog, a trace dialog, and a context menu providing at least one of an execute check functionality or an execute modify functionality; and
presenting a detailed view, the detailed view including a table view and a form view, wherein the table view displays a plurality of formatted outputs enabling a user to interact with or view detailed information associated with a plurality of different business object instances and the form view displays detailed information for a single business object instance.

2. The method of claim 1, wherein the structural presentation comprises a hierarchical presentation of the business object.

3. The method of claim 1, wherein filtering the structural presentation comprises filtering based on intra-business object associations.

4. The method of claim 1, wherein presenting the at least a portion of the views comprises presenting the structural presentation including a number beside at least one business object node, wherein the number is indicative of a number of instances of the business object node.

5. The method of claim 1, wherein the detailed view is associated with one or more of the business object instances.

6. The method of claim 1, wherein presenting the at least a portion of the view comprises simultaneously presenting the structural view and the detailed view on a graphical user interface.

7. The method of claim 1, wherein the presented detailed view comprises presenting a dialog that enables modification of one or more of the business object instances.

8. The method of claim 1, wherein the form view includes all functions of the table view that can be applied to the single business object instance.

9. The method of claim 1, wherein the form view allows users to navigate through the list of business object node instances displayed in the table view.

10. The method of claim 1, wherein presenting a testing interface comprises simultaneously presenting the structural view and the testing view on a graphical user interface.

11. A business object developer's tool comprising:
means for identifying, using a computer, at least one of a plurality of business objects in a development environment;
means for parsing the identified business objects to determine various graphical views, at least one of the graphical views comprising a structural presentation of the business object;
means for filtering the structural presentation based on one or more filter criteria;
means for presenting at least a portion of the views including the structural view;
means for presenting a testing interface, wherein the testing interface includes a breakpoint selection dialog, a trace dialog, and a context menu providing at least one of an execute check functionality or an execute modify functionality; and
means for presenting a detailed view, the detailed view including a table view and a form view, wherein the table view displays a plurality of formatted outputs enabling a user to interact with or view detailed information associated with a plurality of different business object instances and the form view displays detailed information for a single business object instance.

12. The developer's tool of claim 11, wherein the means for filtering the structural presentation comprises means for filtering based on intra-business object associations.

13. The developer's tool of claim 11, wherein the means for filtering the structural presentation comprises means for filtering based on cross-business object associations.

14. The developer's tool of claim 11, wherein the detailed view is associated with one or more of the business object instances.

15. The developer's tool of claim 11, wherein the form view includes all functions of the table view that can be applied to the single business object instance.

16. The developer's tool of claim 11, wherein the form view allows users to navigate through the list of business object node instances displayed in the table view.

17. A computer-program product comprising a non-transitory computer-usable medium having computer program code embodied therein, and operable when executed to:
- identify, using a computer, at least one of a plurality of business objects in a development environment;
- parse the identified business objects to determine various graphical views, at least one of the graphical views comprising a structural presentation of the business object;
- filter the structural presentation based on one or more filter criteria;
- present at least a portion of the views including the structural view;
- present a testing interface, wherein the testing interface includes a breakpoint selection dialog, a trace dialog, and a context menu providing at least one of an execute check functionality or an execute modify functionality; and
- present a detailed view, the detailed view including a table view and a form view, wherein the table view displays a plurality of formatted outputs enabling a user to interact with or view detailed information associated with a plurality of different business object instances and the form view displays detailed information for a single business object instance.

18. The computer-program product of claim 17, further operable to present a hierarchical presentation of the business object.

19. The computer-program product of claim 17, further operable to filter the structural presentation based on intra-business object associations.

20. The computer-program product of claim 17, wherein the detailed view is associated with one or more of the business object instances.

21. The computer-program product of claim 17, wherein the form view includes all functions of the table view that can be applied to the single business object instance.

22. The computer-program product of claim 17, wherein the form view allows users to navigate through the list of business object node instances displayed in the table view.

* * * * *